United States Patent [19]

Olek

[11] Patent Number: 4,663,775
[45] Date of Patent: May 5, 1987

[54] METHOD AND APPARATUS FOR TESTING REMOTE COMMUNICATION SYSTEMS

[75] Inventor: David J. Olek, Victor, N.Y.

[73] Assignee: Teleprobe Systems Inc., Copiague, N.Y.

[21] Appl. No.: 664,912

[22] Filed: Oct. 26, 1984

[51] Int. Cl.⁴ .............................................. H04M 3/30
[52] U.S. Cl. ....................................... 379/24; 379/102
[58] Field of Search .................. 179/175.3 R, 175.3 F, 179/175, 175.2 C, 175.2 D, 2 A, 2 E; 375/10; 371/22; 370/14

[56] References Cited

U.S. PATENT DOCUMENTS 4,424,421  1/1984  Townsend et al. .......... 179/175.3 R

Primary Examiner—Stafford D. Schreyer
Attorney, Agent, or Firm—Pennie & Edmonds

[57] ABSTRACT

A method and apparatus are described for testing a telecommunication line despite a gap in a metallic line between the testing system at a central office and the subscriber's line. On the subscriber's or remote end of the gap in the metallic line, apparatus is provided for performing certain desired tests on the continuous metallic portion of the subscriber's line. This apparatus is connected to a testing system on the central office or local side of the gap with suitable communication equipment so that tests performed on the remote end may be reported back to the testing system. The remote end testing apparatus is similar to apparatus described in application Ser. No. 645,479. The testing system at the central office preferably is a conventional system, such as the MLT system which already is installed in many central offices throughout the United States, together with the necessary modifications to communicate with and control the remote end testing apparatus. The necessary modifications can be implemented in software by modifying the computer programs that run the MLT system. Alternatively, the necessary modifications are implemented in hardware by providing at the local end apparatus that can simulate certain operating parameters of the subscriber's line and by providing communication between the remote end testing apparatus and the simulation equipment.

16 Claims, 3 Drawing Figures

METHOD AND APPARATUS FOR TESTING REMOTE COMMUNICATION SYSTEMS

CROSS-REFERENCE TO RELATED APPLICATIONS

Related applications, incorporated herein by reference, are "Method and Apparatus for Supervising the Accessing and Testing of Communication Systems", Ser. No. 645,478, abandoned, "Method and Apparatus for Accessing Communication Systems", Ser. No. 645,875, now U.S. Pat. No. 4,629,836, and "Method and Apparatus for Testing Communication Systems", Ser. No. 645,479, filed Aug. 29, 1984, now U.S. Pat. No. 4,611,101, and assigned to TII Computer Systems, Inc.

BACKGROUND OF THE INVENTION

This relates to the maintenance and testing of communication lines and, in particular, to the maintenance and testing of conventional telephone lines.

Communication lines require periodic testing, maintenance and repair. At first, telephone system operators employed an entirely manual process of accessing, testing and servicing subscriber lines. However, these manual procedures allowed inoperative lines to go undetected for long periods and frequently resulted in a substantial delay between the initial report of trouble on a line and the verification and identification of that trouble. Line trouble was often discovered only when a subscriber's service had been interrupted, and even after it was reported, a rapid, accurate and intelligent response to the trouble report or to a subsequent inquiry was impossible in the majority of circumstances. In addition, the speed and accuracy of certain line tests depended on the experience of the tester and upon how quickly information about the subscriber's telephone equipment could be manually retrieved from a file; and the whole process was very much labor intensive.

In an effort to acquire better line testing, maintenance and repair capabilities, in the 1970's American Telephone and Telegraph, Inc. developed and implemented Automatic Repair Service Bureaus (ARSBs) in the predecessors of the Regional Bell Operating Companies (RBOCs). See P. S. Boggs and M. W. Bowker, "Automated Repair Service Bureau: Evolution", *Bell System Technical Journal,* Volume 61, No. 6, Part 2, pp. 1097–1114 (July–August, 1982). The ARSBs utilized a Loop Maintenance Operating System (LMOS) and a Mechanized Loop Testing (MLT) system.

LMOS provides four basic services to the ARSBs. First, the system generates and maintains a data base containing very detailed information. Records in this data base, known as "line records," reflect such information as the telephone equipment in use at a subscriber's site, the electrical characteristics of this equipment, whether there are any unresolved reports of trouble on the line, and whether the subscriber's account shows an unpaid balance.

Second, LMOS performs computerized trouble report processing. When trouble on a line is reported by a subscriber, an entry is made in the applicable line record. The telephone company employee receiving the subscriber's call can use the MLT system, described below, to perform some preliminary tests on the line and verify or discount the report. If the tests disclose no line trouble, the employee will inform the subscriber that the line is in working order and make an entry in the line record reflecting that fact. Alternatively, if the test results indicate that trouble does exist, the employee's entry will indicate that further testing by MLT is required. Thus, LMOS allows the existence and status of a pending trouble report to be readily determined.

The third basic service provided by LMOS involves the generating of management and analysis reports by utilizing the information stored in its data base. These reports include analyses of the ARSBs' efficiency and the prediction and identification of problem areas in repair operations.

Finally, because LMOS keeps track of repair force locations and commitments, the system allows for efficient repair force deployment. This is particularly important when a subscriber is requested to remain at a site for repair operations. LMOS, as a provider of these services, clearly represents a material advance over prior manual record and report processing procedures.

An MLT system essentially performs computer controlled tests on the communication lines and interprets the results of those tests. The MLT system obtains information about the normal electrical characteristics of a subscriber's line from the LMOS database and uses it to generate a series of adaptive tests in order to determine the current status of the line. For example, the subscriber may use what is referred to as "inward-only" service, in which outgoing calls on the line are not permitted, and thus no dial tone is provided. There would be little point in running a test to detect a dial tone on such a line. In addition to information about the subscriber's termination equipment, LMOS also contains data describing central office equipment and outside - plant equipment on the line. This data is also required for meaningful MLT testing.

MLT accesses selected lines at and through communication test head hardware. The test head first ensures that the voltage on the line to be tested is not high enough to damage the testing equipment. Then, depending upon the manner in which a line is accessed, other preliminary tests may be performed to ascertain whether a given line is available for testing, including for example, whether the line is on intercept, or whether it is currently in use. If the line is available, MLT performs a series of diagnostic tests designed to determine the line's operational status. These tests typically include measurements of AC and DC voltage and current, resistance and capacitance measurements, dial tone detection, dial pulse and DTMF tests and noise checks. In addition the MLT system can detect the existence of an open wire and determine the location of the break.

The MLT system then interprets the results of these tests in accordance with information acquired from the LMOS data base. Frequently, these results can be used to respond to a subscriber trouble report or inquiry while he is still on the line. In addition, a detailed analysis of the test results can be routed to repair service personnel to enable repair operations to be accomplished quickly and efficiently.

As the MLT system is presently implemented, the communication lines that are tested by this system must be continuous metallic lines between the subscriber and the MLT system which ordinarily is located at a central office. However, in order to reduce transmission costs it is becoming widespread practice in the communication industry to use multiplexing arrangements and/or fiber optic communication links in some portion of the communication line between a central office and some subscribers. In such instances, because the MLT system at the central office does not have a continuous metallic line to the subscriber, it cannot use the diagnostic test sequences it has been programmed to perform to determine the line's operational status.

SUMMARY OF THE INVENTION

I have devised a method and apparatus for surmounting the difficulties imposed by the absence of a continuous metallic line to the subscriber. In accordance with the invention, on the subscriber's or remote end of the gap in the metallic line I provide apparatus for performing certain desired tests on the continuous metallic portion of the subscriber's line. Further, I connect the apparatus on the remote side of the gap to a testing system on the central office or local side of the gap with suitable communication equipment so that tests initiated by the testing system at the central office may be performed on the remote end and test results may be supplied back to the testing system.

Advantageously, the remote end testing apparatus is quite similar to the apparatus described in the above referenced related applications and especially the application entitled "Method and Apparatus for Testing Communication Systems". The testing system at the central office preferably is a conventional system, such as the MLT system which already is installed in many central offices throughout the United States, together with the necessary modifications to communicate with and control the remote end testing apparatus. The necessary modifications can be implemented in software by modifying the computer programs that run the MLT system. Alternatively, the necessary modifications are implemented in hardware by providing at the local end apparatus that can simulate certain operating parameters of the subscriber's line and by providing communication between the remote end testing apparatus and the simulation equipment. As a result, using the software already installed, the conventional MLT system can test the subscriber's line even though there is no continuous metallic pathway to such line. Advantageously, communication between the local and remote apparatus can be achieved using the Digital Data System presently in use in the United States together with appropriate interfaces and digital-to-analog and analog-to-digital converters.

BRIEF DESCRIPTION OF THE DRAWINGS

These and other objects, features and advantages of my invention will be more readily apparent from the following detailed description of an embodiment of the preferred invention in which.

DETAILED DESCRIPTION OF THE PREFERRED EMBODIMENT

Figure 1:
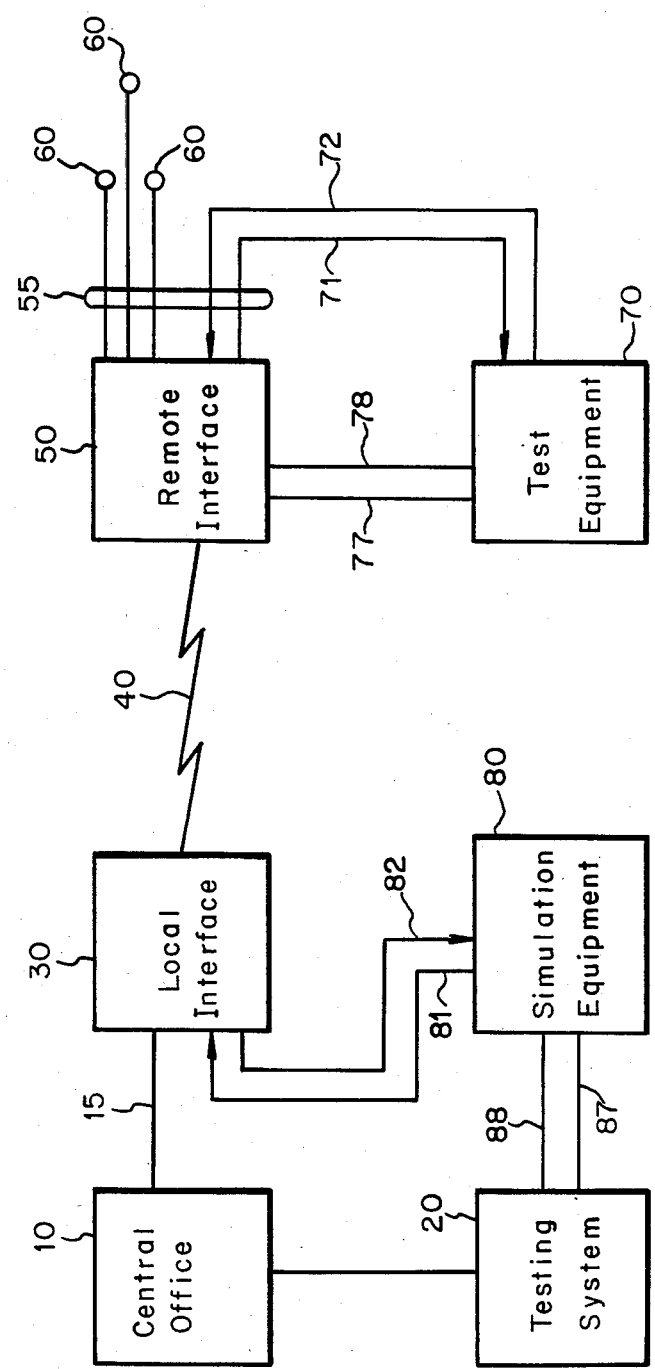
FIG. 1 is a block diagram illustrating a typical communication system in which the invention is practiced.

FIG. 1 depicts one type of communication system in which the invention is practiced. As shown therein, the communication system comprises a central office 10, a local interface 30, a communication line 40, a remote interface 50 and a plurality of subscriber stations 60. Each of the subscriber stations is connected to the remote interface by a continuous metallic communication line 55. The local and remote interfaces are interconnected by communication line 40 which does not provide a continuous metallic communication line between the central office and the subscriber. The local interface is connected by a communication line 15 directly to the central office. Interfaces 30 and 50 illustratively provide a multiplexing function as a result of which active subscriber lines share communication line 40 on a frequency division or time division basis. Advantageously, communication line 40 is a multi-channel digital data communication link such as the T1 digital carrier system which provides 24 simultaneous channels, each of which has a digital data communication rate of eight kilobytes per second. The foregoing system is part of the present telecommunication system used in the United States and is described, for example, in *Telecommunication Transmission Engineering* (AT&T 1975), which is incorporated herein by reference, and especially Chapter 18. Interfaces 30, 50 may take numerous forms. Illustratively, they may be the concentrators or pair gain devices used in subscriber loop concentrator switching systems such as the SLC (TM)-96 digital subscriber loop carrier system.

To provide for testing of subscriber lines, the presently existing telecommunication system includes a testing system 20 at the central office that typically includes an MLT system connected to LMOS. However, this testing system presently can only test subscriber lines that are connected by continuous metallic lines to the central office where the MLT System is located.

In accordance with one embodiment of the present invention, I provide test equipment 70 at remote interface 50 in order to test the continuous metallic portion of the subscriber lines; and I provide simulation equipment 80 at the local interface for simulating the subscriber's line. The simulation and test equipment further comprise communication apparatus for transmitting testing instructions from testing system 20 at the local end to the remote end and for supplying the test results from the remote end to testing system 20. Advantageously, the simulation and test equipment operate in such a way that the absence of a continuous metallic line from testing system 20 to the subscriber is not detected by the testing system. As a result a conventional device such as the MLT system may be used as testing system 20 without any modification of its hardware or software.

Test equipment 70 is connected to remote interface 50 by a receive data channel 71, a transmit data channel 72, and tip and ring test lines 77 and 78. Receive data channel 71 and transmit data channel 72 are each connected to a separate one of the communication channels in communication line 40 between the local and remote interfaces. Illustratively, each channel is an eight kilobyte per second channel in a conventional 24 channel Digital Data System. Tip and ring test lines 77, 78 are two wires of a conventional wire pair used in telecommunications.

Remote interface 50 provides connections between the channels of communication line 40 and individual subscriber lines 55. It also provides connections to both the receive data and send data channels and the tip and ring test lines. The connection between the receive data and send data channels and two of the channels in communication line 40 is conventional because the two data channels are treated as if they were subscriber lines. For example, if remote interface 50 is a pair gain device, the interface to each channel 71, 72 is simply a data-channel-to-data-channel subscriber line interface card. Newer designs of pair gain interfaces include a pair of test wires that can be selectively connected to the tip and ring lines of each subscriber's line connected to the pair gain device. In the practice of the invention, this pair of test wires is connected to tip and ring test lines 77, 78. In the event remote interface 50 does not provide the capability of connecting lines 77, 78 to the tip and ring lines of the subscriber lines, this capability can be provided by adding to each subscriber line the necessary switches to selectively connect the subscriber's line to tip and ring lines 77, 78.

Simulation equipment 80 is connected to local interface 30 by a send data channel 81 and a receive data channel 82. These channels are connected by interface 30 to those two channels of communication line 40 that are connected to receive data channel 71 and send data channel 72. As a result data may be transmitted via an eight kilobyte channel from simulation equipment 80 to test equipment 70 and data may be transmitted by a second eight kilobyte channel from test equipment 70 to simulation equipment 80.

Simulation equipment 80 is connected to testing system 20 by a metallic pair of tip and ring lines 87, 88. Where the test equipment is the MLT system, this connection is made through a test trunk that is available in such equipment. As shown in FIG. 1, test system 20 is also connected to central office 10 through which it is able to access communications line 15 in order to send signals to remote interface 50. The monitoring of a pair of wires for testing purposes on one test trunk and the provision of control signals for such testing on another test trunk is a conventional capability of existing MLT systems.

Figure 2:
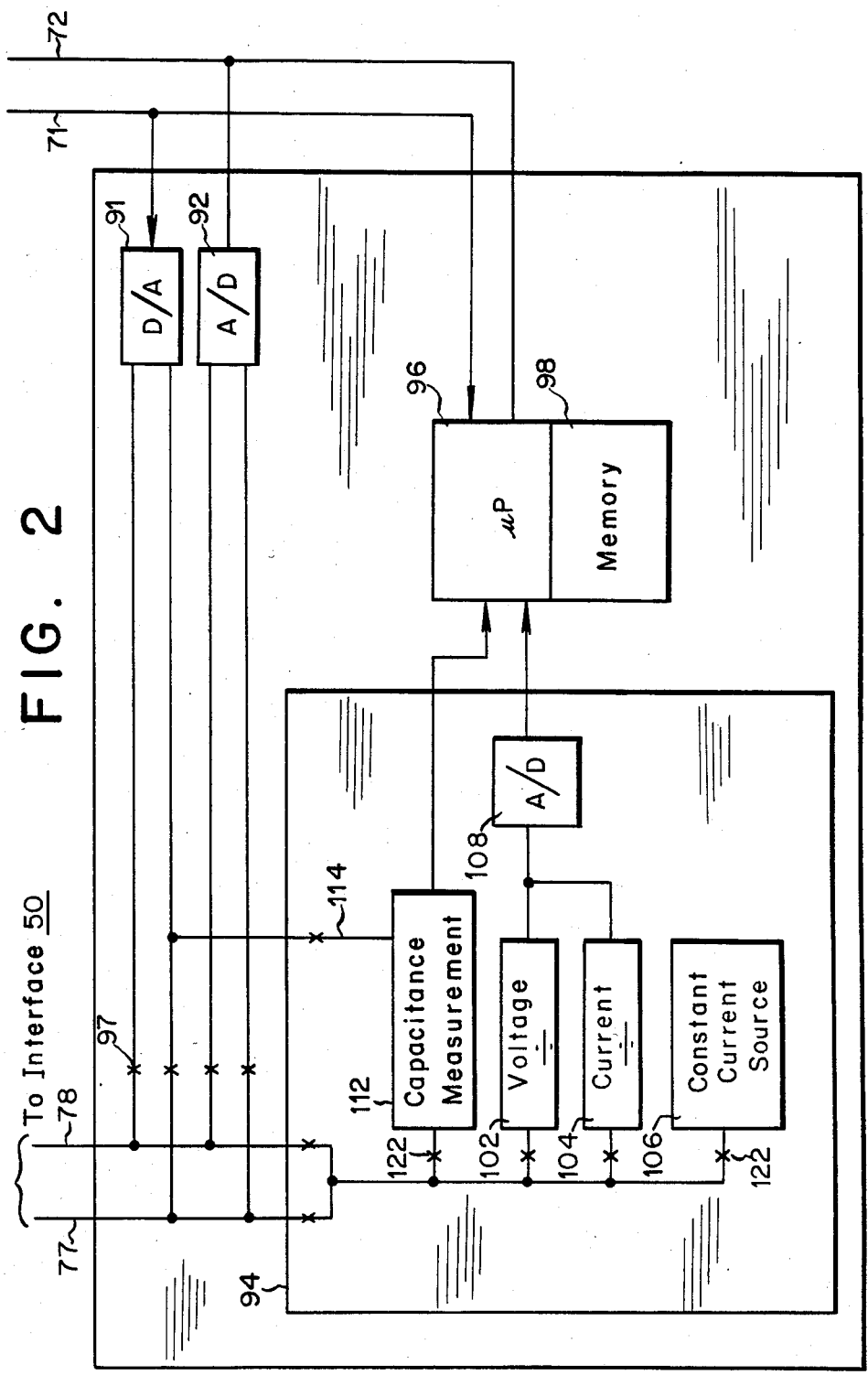
FIG. 2 is a block diagram showing the presently preferred embodiment of the apparatus used to perform subscriber line tests, at the remote end of a communication line.

Further details of remote test equipment 70 are shown in FIG. 2. The apparatus comprises a digital-to-analog converter 91, an analog-to-digital converter 92, test circuitry 94, a microprocessor 96 and a microprocessor memory 98. Digital-to-analog converter 91 converts digital signals from receive data channel 71 to analog signals that are selectively applied to tip and ring lines 77, 78 through relay switches 97 under control of microprocessor 96. Likewise under control of microprocessor 96, analog-to-digital converter 92 converts analog signals from tip and ring test lines 77, 78 to digital signals that are provided to send data channel 72. The use of a microprocessor to control relays 97 so as to selectively apply signals from digital-to-analog converter 91 to tip and ring lines 77, 78 or from lines 77, 78 to analog-to-digital converter 92 will be apparent to those skilled in the art. Microprocessor 96 is also able to communicate directly with simulation equipment 80 via a direct connection with data channels 71, 72. When this occurs, digital-to-analog converters 91, 92 are temporarily disabled.

Illustratively, the converters have eight bits of resolution and therefore the capability of producing any one of 256 digital values in response to an analog input or the capability of producing 256 analog values in response to the corresponding digital input. Such capabilities are well within the skill of the art and integrated circuit chips for such conversion are readily available. If greater resolution is desired, two of the eight kilobyte per second channels could be dedicated to receive data channel 71 and two more to send data channel 72, thereby providing 16 bit resolution. Alternatively, bandwidth in the eight kilobyte channel could be traded for resolution so that nine or ten bits of resolution could be provided with an accompanying loss of bandwidth in accordance with the Nyquist criterion.

Test circuit 94 performs a series of tests on a subscriber line to which tip and ring lines 77, 78 are connected by remote interface 50. These tests are performed under the control of microprocessor 96 which in turn is controlled by a program stored in memory 98. Different types of test circuit microprocessors and programs may be used to perform these tests. Preferred apparatus is disclosed in the above referenced related patent applications and in particular "Method and Apparatus for Testing Communication Systems". The more important aspects of the test circuit are shown in FIG. 2.

In particular, test circuit 94 comprises a voltage divider 102, a current divider 104, a current source 106, an analog-to-digital converter 108, and a capacitance measurement circuit 112. Tip and ring test lines 77, 78 may be selectively coupled to the voltage divider, current divider, current source or capacitance measurement circuit by operation of appropriate relays 122 under control of microprocessor 96. The outputs of analog-to-digital converter 108 and capacitance measurement circuit 112 are provided to microprocessor 96 which uses such outputs to calculate operating parameters of the subscriber line 55 to which tip and ring test lines 77, 78 are connected by interface 50. Illustratively, such parameters include:

1. Resistance: tip-to-ring, tip-to-ground and ring-to-ground;
2. DC voltage: tip-to-ground and ring-to-ground;
3. DC current: tip-to-ground and ring-to-ground; and
4. Amplitude loss and phase shift in a low frequency AC signal applied to the subscriber line, from which capacitance and AC impedance can be determined. Other parameters may also be measured if desired and additional circuitry may be provided to effect such measurements.

Details of the specific circuit elements shown in FIG. 2 are set forth in the above referenced application "Method and Apparatus for Testing Communication Systems", Ser. No. 645,479, now U.S. Pat. No. 4,611,101. Voltage divider 102 can be implemented using voltage divider circuit 350 and voltage divider select circuit 355 of FIG. 4 of the '479 application; current divider 104 can be implemented using current divider circuit 360 and current divider select circuit 370 of the '479 application; current source 106 can be implemented using constant current source 380; and analog-to-digital converter 108 can be implemented using A/D converter 400. Capacitance measurement circuit 112 can be implemented in accordance with the teaching of the capacitance measurement circuit of FIGS. 7 and 8 of the '479 application. The circuit of FIG. 3 differs from that of FIGS. 7 and 8 of the '479 application in that the low frequency tone on line 712 of FIG. 7 of the '479 application is not generated in the remote test equipment, but rather is generated by testing equipment 20. As detailed below, this tone is transmitted as digital data to the remote test equipment where it is received on data channel 71, is converted to an analog tone by digital-to-analog converter 91 and is applied to capacitance measurement circuit 112 via line 114.

Measurements of the above identified circuit parameters are made by test circuit 94 and microprocessor 96 in the same fashion as these parameters are measured by the circuitry of the above referenced '479 application. When the measurements are made, they are then transmitted by the microprocessor on data channel 72 to the simulation equipment 80 at the local end.

Figure 3:
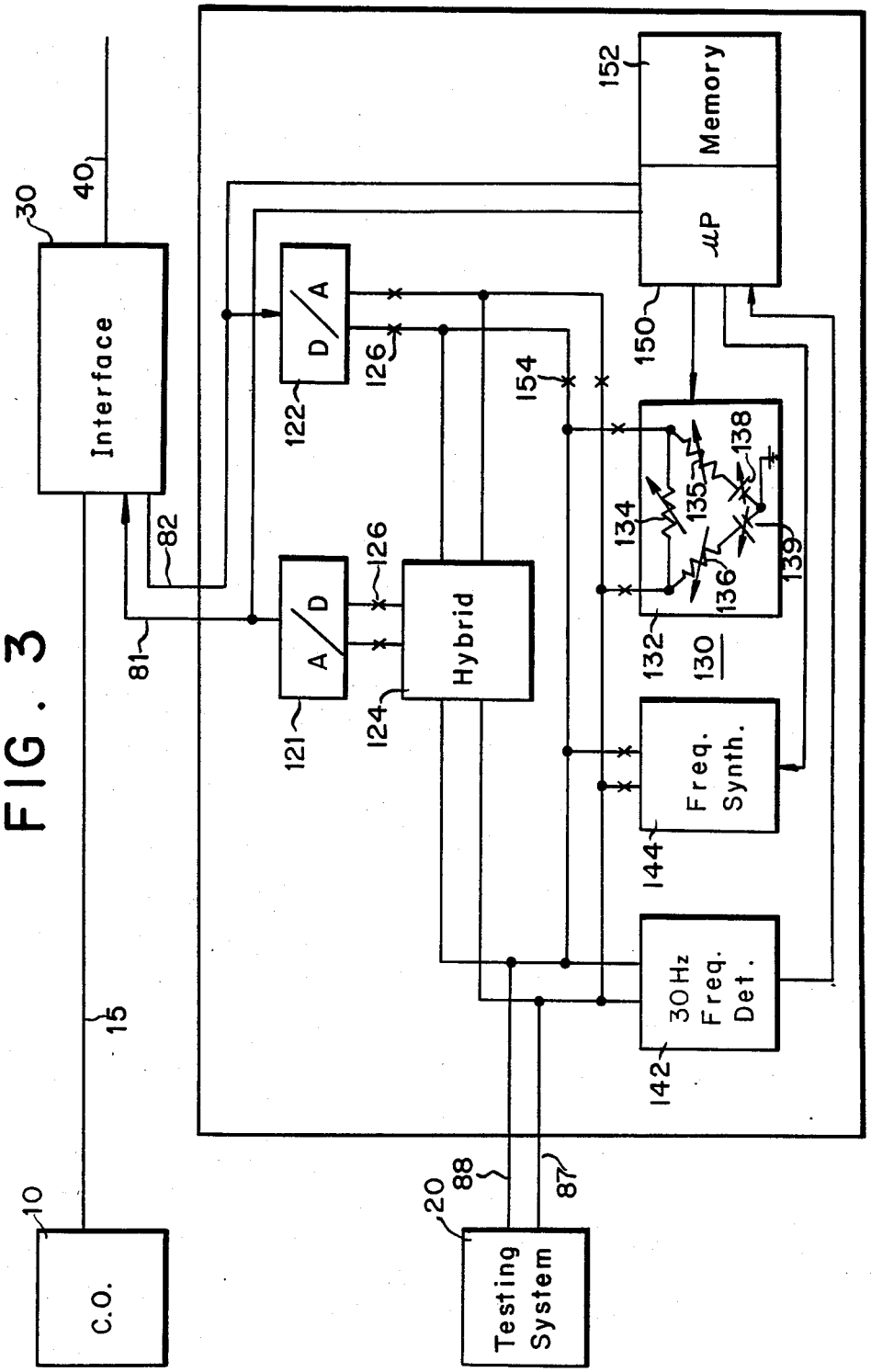
FIG. 3 is a block diagram showing the presently preferred embodiment of apparatus used at the local end of a communication line in performing subscriber line tests.

As shown in FIG. 3, simulation equipment 80 comprises an analog-to-digital converter 121, a digital-to-analog converter 122, a hybrid 124, a simulated test head 130, a microprocessor 150 and a microprocessor memory 152. Digital-to-analog converter 122 converts digital signals from receive data channel 82 to analog signals that are selectively applied to tip and ring lines 87, 88 through relay switches 126 and hybrid 124. Likewise, analog-to-digital converter 121 converts analog signals from tip and ring lines 87, 88, hybrid 124 and relay switches 126 to digital signals that are provided to send data channel 81. As in the case of the remote test equipment, microprocessor 150 controls relay switches 126 in a manner known to those skilled in the art to select a particular line 87 or 88. Microprocessor 150 is also able to communicate directly with test equipment 70 via a direct connection with data channels 81, 82. When this occurs, digital-to-analog and analog-to-digital converters 121, 122 are temporarily disabled.

Hybrid 124 is a conventional device widely used in telephony to connect a two wire line such as tip and ring lines 87, 88 to a four wire line such as the two leads to analog-to-digital converter 121 and the two leads from digital-to-analog converter 122. The hybrid will suppress signals on one of the two pairs of the four wire lines.

Simulated test head 130 comprises a simulated delta test head 132, a low frequency detector 142 and a frequency synthesizer 144. Test head 132 comprises variable resistors 134, 135, 136 and variable voltage sources 138, 139 connected in a delta configuration so that resistor 134 is connected between tip and ring nodes, resistor 135 and voltage source 138 are connected in series between ring and ground and resistor 136 and voltage source 139 are connected in series between tip and ground. These variable resistors and variable voltages sources are conventional devices whose output may be controlled by the output of a digital-to-analog converter. For example, each of the variable resistances can be a MOSFET having a source to drain resistance that can be varied from zero to two MegOhms depending on the analog voltage applied to its gate electrode; and a digital signal applied to the simulated test head can be converted to an analog signal for control of such gate electrode simply by applying the signal to a register whose output is connected to the gate. Advantageously, it may be desirable to use a non-linear transfer function between the input digital signal and the output resistance to obtain better resolution when resistance and voltage levels are small. Likewise variable voltage sources can also be implemented, for example by using a variable resistor in parallel with a constant current source.

Simulated delta test head 132 is controlled by microprocessor 150 so as to reproduce the DC parameters that are measured by test circuit 94 on the subscriber line being tested. The measurements that are made by test circuit 94 are transmitted to simulation equipment 80 via data channels 72 and 82. This data is applied as digital signals to microprocessor 150 which may mathematically modify the data before using this data to determine the value of variable resistances 134, 135, 136 and variable voltages 138, 139. These resistance and voltage values and the currents they establish can then be read by testing system 20 via tip and ring lines 87, 88.

In addition to testing DC parameters, it is also desirable to test the subscriber's line for its response to AC signals. These tests are ordinarily performed by testing system 20 by applying various signals to the line to be tested. In accordance with the present invention, these tests are performed in the same fashion. Specifically, signals such as tone, noise, speech and other AC signals are applied to the subscriber's line by connecting these signals from testing system 20 to tip and ring lines 87, 88. These analog signals are applied by hybrid 124 to analog-to-digital converter 121 which converts these signals to digital signals that are transmitted on send data channel 81 through interface 30 and one of the channels of communication line 40 to interface 50. At interface 50, the signals are applied via receive data channel 71 to digital-to-analog converter 91 which recreates the analog tone and applies it to one of tip and ring lines 77, 78 which are connected by interface 50 to the subscriber line being tested.

Return signals from the subscriber line are applied by one of tip and ring lines 77, 78 to analog-to-digital converter 92 and are transmitted as digital data on channels 72 and 82 to digital-to-analog converter 122 where they are converted back to analog signals. These signals are then routed by microprocessor-controlled relay switches 154 around hybrid 124 to testing system 20 which can then evaluate the returned signal in the same fashion as it would evaluate a returned AC signal if it were connected directly to the subscriber line via a continuous metallic pathway. Because digital data transmission is used for transmission between interfaces 30 and 50, the amplitude and frequency of tone signals at the output of the digital-to-analog converters at either end of the system can be controlled and are controlled so that they are substantially the same as the amplitude and frequency of the tone signals at the input of the analog-to-digital converters at the other end. As a result, AC current and AC voltage as well as responses to tones, noise and speech in the subscriber line can be measured by testing system 20 just as if it were connected directly to the continuous metallic pathway of the subscriber line.

While the effects of communication line 40 and interfaces 30 and 50 on amplitude and frequency can be controlled, phase lag cannot. Because capacitance and AC impedance are typically measured by determining amplitude loss and phase lag in a low frequency signal applied to the subscriber line, a different signaling process is required to measure such parameters. In accordance with the present invention, amplitude loss and phase lag are measured at the remote end of the system and these measurements are used to recreate a signal at the local end having the specified amplitude loss and phase lag.

In particular, a capacitance measurement is begun by testing system 20 which generates a low frequency tone usually between 20 and 30 Hz and applies this signal to tip and ring lines 87, 88. The tone is provided by hybrid 124 to analog-to-digital converter 121 which digitizes it and transmits it via interface 30, one of the channels of communication line 40, and interface 50 to digital-to-analog converter 91. There the analog tone is recreated and applied to capacitance measurement circuit 112. As indicated above, capacitance measurement circuit is similar to the capacitance measurement circuit shown in FIGS. 7 and 8 of the '479 application; and the low frequency tone is applied to the inputs to circuits that are the same as capacitance measurement control circuit and elimination buffer 720 and phase correction circuit 740. A coupling control circuit similar to coupling control circuit 725 of the '479 application then applies the low frequency tone to one of tip and ring lines 77, 78 which are connected to the subscriber line being tested. Phase lag is then measured under control of microprocessor 96 by circuits equivalent to zero crossing detector 750, counter control circuit 760, lag time counter 770 and latch 780 of FIG. 7 of the '479 application. Amplitude loss is measured as detailed in the '479 application by applying the attenuated and unattenuated low frequency tones to AC voltage measurement circuitry shown in FIGS. 4 and 5 of that application, determining the RMS value of the signal amplitude and converting that value to a digital value using analog-to-digital converter 108 of test circuit 94.

The measured phase lag and amplitude loss are then sent as discrete digital signals by microprocessor 96 over data channels 72, 82 to microprocessor 150 where they are converted back to analog signals having identical phase lag and amplitude loss in relation to the applied low frequency signal from testing system 20.

At the time testing system 20 initiates the capacitance test by applying a low frequency tone to tip and ring lines 87, 88, low frequency detector 142 senses this tone and alerts microprocessor 150 that this test is underway. Microprocessor 150 then monitors the signals on channels 81, 82 for receipt of data representative of the phase lag and amplitude loss measured by the capacitance measurement circuit 112 of test equipment 70.

Upon receiving this data, microprocessor 150 then activates frequency synthesizer 144 to generate a low frequency tone at the same frequency as the low frequency tone from testing system 20 and at an amplitude and phase lag that is the same as that measured by capacitance measurement circuit 12. Illustratively, frequency synthesizer 144 can be the same circuit as the programmable tone generation circuit 600 and level select circuit 680 shown in FIG. 6 of the '479 application. As will be evident, any phase lag can be provided in such a circuit simply by varying the address initially loaded into address sequencer 615 at the time the circuit begins to generate its output.

The circuitry of FIGS. 1 through 3 permit testing system 20 to test a subscriber line in conventional fashion even though the testing system is not connected to the subscriber line by a continuous metallic pathway. Remote test equipment 70 is always connected to interface 50 and is programmed to make and transmit every few seconds the above described DC and AC measurements even if it is not connected to a subscriber line. When testing system 20 initiates a test, it sends instructions via central office 10, line 15, interface 30 and communication line 40 to interface 50 which causes interface 50 to connect the selected subscriber line 55 to tip and ring lines 77, 78. The testing system then waits several seconds for the lines to settle. The amount of this delay can be varied in testing systems such as the MLT system and accordingly can be made longer than the time required for the remote test equipment to make a new series of tests. Accordingly, while the testing system is waiting, remote test equipment 70 performs its measurements on the subscriber line and forwards them to simulation test head 130 where microprocessor 150 establishes in delta test head 132 the appropriate resistance and voltage values measured by the remote test equipment. The testing system then looks at tip and ring lines 87, 88 to measure DC parameters and measures the values established by the variable resistances and voltages of delta test head 132.

Next, testing system 20 performs its standard series of AC tests. Tests which do not involve phase lags are performed in the normal way and the testing system does not recognize that the signals returned from digital-to-analog converter 122 were not connected to the subscriber line by a continuous metallic pathway. When the testing system begins the capacitance test by applying a low frequency tone to tip and ring lines 87, 88, frequency detector 142 recognizes this tone and conditions microprocessor 150 for receipt of attenuation loss and phase lag measurements from test equipment 70. The tone is transmitted as a digital signal to test equipment 70 and used to perform the attentuation loss and phase lag measurement; and these measurements are then transmitted to simulation equipment 80 where they are used by microprocessor 150 to generate a tone having the attentuation loss and phase lag measured by the test equipment 70.

As a result, testing system 20 is able to perform the same sequence of measurements in the same way as it would if there were a continuous metallic pathway to the subscriber line.

In the alternative, testing system 20 can be modified internally so as to operate directly with test equipment 70. In this case, test equipment 70 would also generate the AC portion of the test by generating and applying appropriate AC signals to the subscriber line and would report back to testing system 20 the results of this portion of the test as well as the results of the DC portion of the test.

As will be apparent to those skilled in the art, numerous modifications may be made in the foregoing invention. For example, additional tests may be performed by test equipment 70 and additional operations performed at the remote end under control of equipment at the central office.

What is claimed is:

1. In a telecommunication system comprising a communication line, a local interface connecting the communication line to a central office and a remote interface connecting the communication line to at least one continuous metallic subscriber line, there being no continuous metallic path from the subscriber line to the central office, and means connected to the central office side of the local interface for testing the subscriber line, apparatus for testing said subscriber line comprising:

means at the remote interface for measuring at least one of subscriber line resistance, DC current and DC voltage, said means being connected by continuous metallic leads to said subscriber line;

means at the remote interface for applying to the subscriber line at least one AC signal to measure AC characteristics of the subscriber line;

means at the local interface for simulating at least one of the subscriber line resistance, DC current and DC voltage and AC characteristics that are measured at the remote interface;

means at the remote interface for transmitting to the simulating means measurements made by the measuring means and signals representative of said AC characteristics of the subscriber line; and means at the local interface for connecting said simulating means to said testing means, whereby said testing means measures circuit parameters generated by said simulating means that simulate measurements made on the subscriber line by the means located at the remote interface.

2. The apparatus of claim 1 wherein said AC signal applying means comprises a digital-to-analog converter having a digital input connected to a digital data line from the local interface and an analog output connected to the subscriber line.

3. The apparatus of claim 1 wherein said means for transmitting signals comprises an analog-to-digital converter having an analog input connected to the subscriber line and a digital output connected to a digital data line to the local interface.

4. Apparatus for testing a continuous metallic subscriber line from a controlling location that is not connected to said subscriber line by a continuous metallic line, said apparatus comprising:
 apparatus at said controlling location for measuring at least some of line resistance, DC current and DC voltage;
 a test circuit connected to said subscriber line by a continuous metallic line, said test circuit comprising:
 means for measuring at least some of subscriber line resistance, DC voltage and DC current, and
 means for transmitting said measurements to the controlling location; and
 a simulator at the controlling location comprising:
 means for receiving the measurements transmitted by the test circuit,
 a circuit comprising variable resistances, variable voltage sources and means for adjusting said resistances and voltage sources so that the output of the circuit represents the measurements received by said receiving means, and
 means for connecting said circuit to said measuring apparatus, whereby said measuring apparatus measures circuit parameters representing the measurements made on the subscriber line by the measurement performing means.

5. In a telecommunication system comprising a communication line, a local interface connecting the communication line to a central office and a remote interface connecting the communication line to at least one continuous metallic subscriber line, there being no continuous metallic path from the subscriber line to the central office, means connected to the central office side of the local interface for testing the subscriber line, a method of testing said subscriber line comprising the steps of:
 measuring at the remote interface at least one of subscriber line resistance, DC current and DC voltage, said means being connected by continuous metallic leads to said subscriber line;
 applying to the subscriber line at the remote interface at least one AC signal to determine AC characteristics of the subscriber line; and
 transmitting from the remote interface to the local interface measurements made during the measuring step and signals representative of said AC characteristics of the subscriber line;
 simulating at the local interface at least one of the subscriber line resistance, DC current, DC voltage and AC characteristics; and measuring with said testing means connected to the central office side of the local interface the subscriber line resistance, DC current, DC voltage and AC characteristics that are simulated.

6. The apparatus of claim 1 wherein the simulating means comprises:
 means for receiving the measurements transmitted from the remote interface,
 a circuit comprising resistances, voltage sources and means for adjusting at least one of said resistances and voltage sources so that the output of the circuit represents the measurements received by said receiving means.

7. The apparatus of claim 6 wherein said AC signal applying means comprises a digital-to-analog converter having a digital input connected to a digital data line from the local interface and an analog output connected to the subscriber line.

8. The apparatus of claim 6 wherein said means for transmitting signals comprises an analog-to-digital converter having an analog input connected to the subscriber line and a digital output connected to a digital data line to the local interface.

9. The apparatus of claim 6 wherein the simulating means further comprises processing means to which are applied the measurements received at said receiving means, said processing means controlling the adjusting means in accordance with the measurements received at said receiving means.

10. The apparatus of claim 9 wherein the resistances and voltage sources comprise three variable resistors and two variable voltage sources connected in a delta configuration with a first resistor and a first voltage source connected in series between ring and ground, a second resistor and a second voltage source connected in series between tip and ground, and a third resistor connected between tip and ring and the processing means controls the resistance of each variable resistor and the output voltage of each variable voltage source in accordance with the measurements received from the remote interface by the receiving means.

11. The apparatus of claim 6 wherein the simulating means further comprises a frequency synthesizer for generating a low frequency tone which is applied to the testing means, said tone having an amplitude and a phase lag relative to a tone generated by said testing means that represents AC characteristics of the subscriber line.

12. The apparatus of claim 11 wherein the simulating means further comprises processing means to which are applied signals received by said receiving means that are representative of AC characteristics of the subscriber line, said processing means controlling said frequency synthesizer in accordance with the signals received at the receiving means that are representative of AC characteristics of the subscriber line.

13. The apparatus of claim 4 wherein the simulator further comprises processing means to which are applied the measurements received at said receiving means, said processing means controlling the adjusting means in accordance with the measurements received at said receiving means.

14. The apparatus of claim 13 wherein the resistances and voltage sources comprise three variable resistors and two variable voltage sources connected in a delta configuration with a first resistor and a first voltage source connected in series between ring and ground, a second resistor and a second voltage source connected in series between tip and ground, and a third resistor connected between tip and ring and the processing means controls the resistance of each variable resistor and the output voltage of each variable voltage source in accordance with the measurements received from the remote interface by the receiving means.

15. The apparatus of claim 4 wherein the simulator further comprises a frequency synthesizer for generating a low frequency tone which is applied to the testing means, said tone having an amplitude and a phase lag relative to a tone generated by said measuring apparatus at the controlling location that represents AC characteristics of the subscriber line.

16. The apparatus of claim 15 wherein the simulator further comprises processing means to which are applied signals received by said receiving means that are representative of AC characteristics of the subscriber line, said processing means controlling said frequency synthesizer in accordance with the signals received at the receiving means that are representative of AC characteristics of the subscriber line.

* * * * *